United States Patent [19]

Overton et al.

[11] Patent Number: 4,786,990
[45] Date of Patent: Nov. 22, 1988

[54] SERVO GAIN COMPENSATION IN A DISC DRIVE

[75] Inventors: Wallace H. Overton; Vernon L. Knowles; Bruce J. Jackson, all of Boise, Id.

[73] Assignee: Hewlett-Packard Company, Palo Alto, Calif.

[21] Appl. No.: 869,268

[22] Filed: May 30, 1986

[51] Int. Cl.[4] .............................................. G11B 15/14
[52] U.S. Cl. ........................................ 360/65; 360/67
[58] Field of Search ....................... 360/65, 67, 77, 78

[56] References Cited

U.S. PATENT DOCUMENTS

4,503,471 3/1985 Hanaiamj ............................. 360/77
4,564,869 1/1986 Baumeister ........................... 360/46
4,615,637 9/1986 Adler ................................... 360/46

Primary Examiner—Vincent P. Canney
Attorney, Agent, or Firm—William J. Bethurum

[57] ABSTRACT

Compensation for servo gain variations when connected to different magnetic heads in a disc memory drive is achieved by determining individual servo gain corrections for each magnetic head at several different selected tracks on the associated memory disc, storing the individual servo gain corrections and addressing a stored individual servo gain correction for each selected magnetic head for coupling to the servo to equalize servo gain when positioning each selected magnetic head at a selected track.

6 Claims, 4 Drawing Sheets

SERVO GAIN COMPENSATION IN A DISC DRIVE

TECHNICAL FIELD

This invention relates generally to a magnetic head positioning system in a magnetic disc drive and more particularly to an arrangement for automatically compensating for variations of servo gain when the servo is coupled to different magnetic heads in the disc drive, and is subject to media induced variations.

BACKGROUND ART

Many disc drives use magnetic heads and recorded servo code in a track following mode for keeping the heads track centered during read/write operations. The electromagnetic transducers of these magnetic heads comprise a magnetic circuit having a coil wound thereon. These magnetic circuits vary in effective magnetic widths due to their design and due to the manufacturing process. This variation is not uniform among the magnetic heads and results in variations in servo gain when they are individually connected in the servo loop. Manual adjustment of servo gain was practiced in some instances in the past to compensate for these magnetic head variations.

More recently, automatic gain control systems have been devised for disc drives for automatically compensating for variations in servo gain. Two such systems, representing the closest art to this invention which is presently known to the applicants, are represented in U.S. Pat. Nos. 4,551,776 and 4,578,723.

U.S. Pat. No. 4,551,776 entitled "Automatic Reference Adjustment for Position Error Signal on Disc File Servo System", periodically recalibrates the position error signal to increase or decrease its magnitude by modifying the gain of a variable gain amplifier in the servo loop.

U.S. Pat. No. 4,578,723 entitled "Head Positioning System With Automatic Gain Control", describes a system with automatic gain control which is stated to be substantially independent of head widths and to limit variations in off track gain between heads. Multiphase radial position error signals derived from position reference information on the disc are used to control the position of a transducing head by means of a head positioning actuator. The gain of a variable gain amplifier responsive to the signals from a particular magnetic head connected in the servo loop, is controlled by a gain function derived by combining the different phase position error signals to provide, at any position of the magnetic head, a measurement of the rate of change of the position error signal per track of displacement. The output of the variable gain amplifier is used to control the position of the magnetic head.

Thus, according to the teachings of the first patent, the position error signal is recalibrated to keep it within limits by modifying the gain of a variable gain amplifier and according to the teachings of the second patent, the rate of change of the position error signal per track of displacement is used to control the gain of a variable gain amplifier.

DISCLOSURE OF THE INVENTION

Further improvements in providing uniform servo gain among a plurality of magnetic heads in a disc drive are realized, according to this invention, in an arrangement in which servo gain is measured when connected to each magnetic head at different track positions across each memory disc. Thus head to head servo gain variations and servo gain variations for each head across the associated disc are obtained. Servo gain corrections or references at selected track locations are determined. These are stored and individually accessed each time a magnetic head and track position for that head are selected. The accessed servo gain reference is used to automatically compensate servo gain for each selected head and track position such that the servo gain is substantially the same for each head and is maintained within very close limits as each head moves across the memory disc surface. The servo gain correction or reference for each magnetic head may be stored on a memory disc to be read by the head for that disc when the drive is powered up or, may be stored in a separate memory such as a programmable read only memory for that particular disc drive.

BRIEF DESCRIPTION OF THE DRAWINGS

The invention will be better understood by reference to the following specification when considered in conjunction with the accompanying drawings in which.

BEST MODES FOR CARRYING OUT THE INVENTION

Figure 1:
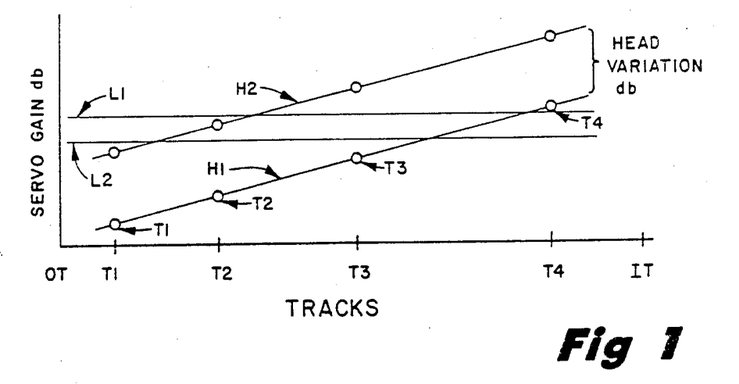
FIG. 1 graphically depicts the variation in servo gain with different magnetic heads and variation in servo gain with a connected head at different track positions on a memory disc.

Servo gain variations with different magnetic heads connected in the servo loop present serious servo design problems. There are variations in the electrical and magnetic performance of the magnetic heads. Thus, each head when connected in the servo loop results in a different servo gain and the servo gain with individual heads varies in different radial positions of the magnetic heads over the repective memory discs. FIG. 1, in simplified form, graphically approximates this situation, plotting servo gain in decibels for two different heads at different track locations between the outer track (OT) and the inner track (IT). To simplify the illustration, the variations in servo gain are plotted linearly. It is apparent from this illustration that the heads when connected into the servo loop result in different servo gains at any track location radially of the memory disc. It is desired that the servo gain be confined within a narrow band such as that defined between the limits of lines L1 and L2 of FIG. 1 which remains relatively constant in gain band width and gain magnitude across the disc tracks.

In achieving this goal, each head when connected in the servo loop, is moved to track positions T1, T2, T3 and T4, for example, and the servo gain is measured at each of these points. The servo gain at each of these points is used to develope a correction or reference quantity or signal, for each head at each track location, which is used to bring the servo gain within acceptable limits, depicted by the lines L1 and L2, at each track position T1, T2, T3 and T4.

Figure 2:
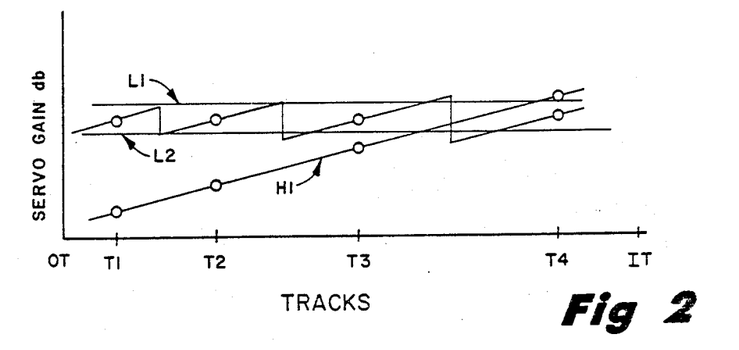
FIG. 2 graphically depicts the technique for providing a substantially constant servo gain for a magnetic head at different track locations on a memory disc.

The result of this is depicted for a single head, say the head H1, as seen in FIG. 2. Here the corrected servo gain for the head H1 at each point T1 through T4, lies approximately at the center between the lines L1 and L2. The rate of change of corrected servo gain as the magnetic head moves across the tracks approximates the rate of change of the uncorrected plot of servo gain, but is corrected at points intermediate the points T1 through T4, at which the servo gain is measured, to result in a sawtooth servo gain variation, as illustrated. Such a servo gain correction for each magnetic head results in individual servo gain correction profiles approximating that illustrated in FIG. 2 and lying substantially within the boundaries of the lines L1 and L2. By this expedient, the servo gain for each head when connected into the servo loop, is substantially the same and remains substantially constant, that is, within the defined limits, throughout the range of track positions from the inner to the outer tracks. The servo gain corrections are separately stored for accessing each time a head and track, are selected to be used in compensating servo gain.

ENVIRONMENT OF THE INVENTION

Disc drives or files conventionally include a plurality of memory discs which are mounted on and axially spaced along a common spindle which is motor driven to drive the discs at a constant speed. Data is recorded on both sides of these discs except for one surface of one disc which is reserved for servo code. Each data track has at least one section or sector of servo code referred to as sampled servo. The sampled servo code is arranged to define a sector on the surface of each of the data discs. There may be several sectors around the surface of each of the discs. The dedicated servo surface has sector marks corresponding in number to the number of sectors on each of the data discs. The beginning of the sector marks on the dedicated servo surface and the beginning of the sampled servo sectors on the data disc surfaces are vertically aligned. One sector mark on the dedicated servo surface identifies the first sector from which the sectors are counted. The sector count on the dedicated servo disc serves as the sector count for all of the data discs.

The magnetic heads are individually supported on flexible arms at one end of a movable servo driven carriage. The servo responds to the selected or requested individual head and track addresses and moves a selected head to a selected track. This is the seek mode of operation. Seek operations proceed under the control of the dedicated servo head on the dedicated servo surface. At the conclusion of the seek move, track following at the selected track is accomplished using the dedicated servo head and then the selected head, called the sampled servo head, which senses the sampled servo code in the selected track on the associated disc surface.

Figure 3:
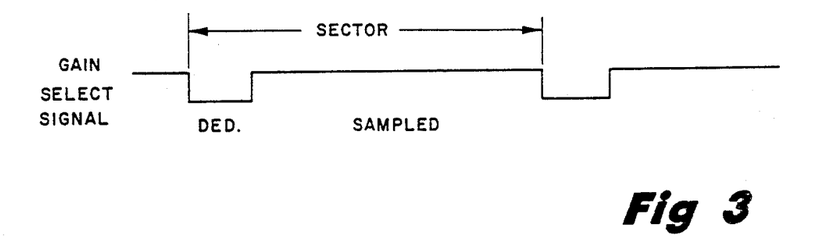
FIG. 3 illustrates a signal used for switching between dedicated and sampled servo gain calibration.

The sampled and dedicated servo gain corrections determined for each head at each track position, T1–T4, are stored, as in a programmable read only memory, according to one embodiment of this invention. Requests from a host computer are processed as memory addresses for servo gain corrections for a selected sampled servo head at a selected track. The track address also accesses the servo gain correction for the dedicated servo head. The stored addressed corrections are multiplexed out of the memory to produce sampled and dedicated servo gain corrections to be respectively combined with the outputs from the sampled and dedicated heads. Multiplexing is achieved using a gain selection signal, FIG. 3, derived from the dedicated servo sector marks. This is a square wave signal which switches between dedicated and sampled servo gain corrections in its respective voltage states. These voltage states are repeated in each sector. Where sector marks on the disc are available, these provide a convenient source of the gain select multiplexing signal. Any other method for developing this signal compatable with circuit time constants may be used.

Figure 6:
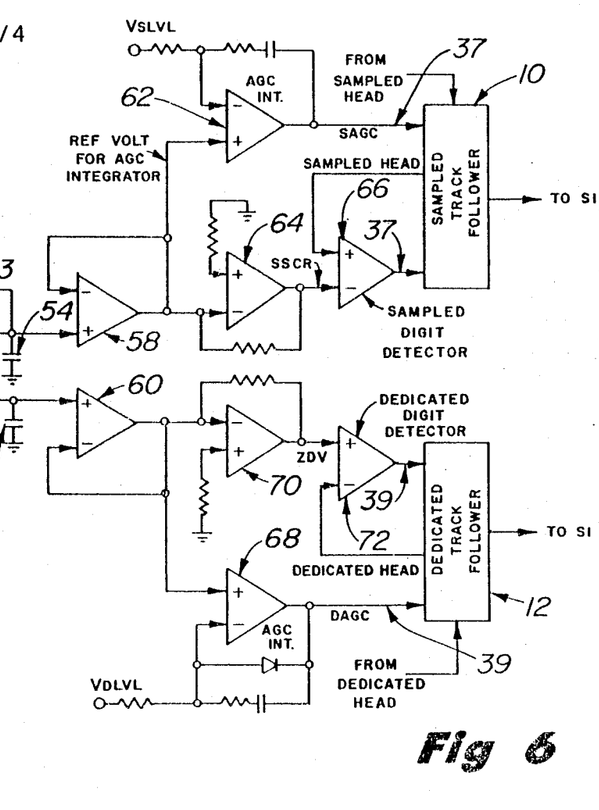
FIG. 6 is a block diagram illustrating the ser o gain compensation features of one embodiment of this invention.
Figure 6A:
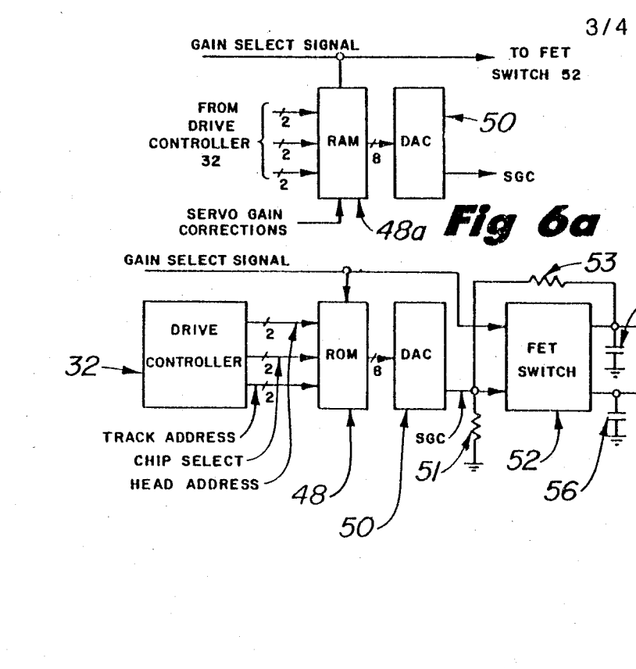
FIG. 6a illustrates a second embodiment of this invention, as a modification of FIG. 6.

The servo system which embodies and implements this invention is shown in the block diagram of FIG. 6. Two separate control systems sharing common parts are used to control the position of the heads. One is a linear position control system or fine position servo which is used in the track following mode of operation to keep the selected dedicated servo head or sampled servo head at the center of the servo track. This is an analog position control system. The other is a nonlinear position control system which is used during the seek mode of operation to move the heads from one track to another.

Only three heads are shown in FIG. 6. One is the dedicated servo head DH, responding to dedicated servo code, and the other two are designated H1 and H2 which are sampled servo heads, each used on the data surface of the associated data disc for reading or writing data and for track following purposes using the sampled servo code.

The linear position control system of FIG. 6 is used at the end of a seek movement to track center the dedicated head and then a selected sampled servo head for reading or writing data. The linear system comprises a sampled servo track follower 10 or a dedicated servo track follower 12, selectively connected by a switch S1 to a position compensation stage 14. The position compensation stage includes a compensater 16 and a feed forward network 18. the output of the compensation stage 14 is connected to a filtering and amplifying network 20, typically comprising a low pass filter, a notch filter and a power amplifier, none of which are shown, via a switch S2, when closed, and a summing junction 22. The filter amplifier 20 controls an actuator 24 driving a carriage 26 which is coupled to a head arm stack 28 which moves the heads DH, H1 and H2 simultaneously. The actuator 24 may be a magnetic driver having a movable member which drives the arm stack carriage 26 to which the head arm stack assemble 28 is mounted. This closes the position loop. The input circuit of the sampled servo track follower 10 is selectively coupled to the head H1 or the head H2 by a switching circuit, here depicted as a switch S3.

In the seek mode of operation, the switch S2 is open. Requests by a host computer 30 processed by a drive controller 32 are coupled as a distance to go to the servo processor 34 by a controller interface 36. With the switch S2 opened, the servo processer controls the seek operation. Negative or positive acceleration command currents via the circuits NC or PC, respectively, produced by the servo processor, are used to drive the actuator in a bang-bang type of control. The nonlinear position control system is used for longer moves, that is across one or more tracks. The move lengths defined by target addresses, in this case, track counts, are always known before a seek movement begins. The servo processor 32 is a model 8051 manufactured by the Intel Corporation of Santa Clara, Calif., although others may be used. There is no velocity transducer in this system. The servo processor is used to control the movement of the actuator 24 based only on track crossing information supplied by a track crossing detector 38. Using bang-bang servo control, the acceleration commanded to the actuator 24 is either on or off.

There are two servo moves in the seek mode of operation. One is the open loop move, and the other is the closed loop move. The open loop system during a seek operation accelerates and decelerates the heads to a final velocity and position which the closed loop system can accept. Thereafter the closed loop system functions to track center the selected head in its track following mode of operation. At the end of a seek operation, the switch S2 is closed and the switch S1 is positioned to connect the dedicated track follower 12 to the position compensation stage 14. In this track following mode of operation, with respect to the dedicated DH, the dedicated head is track centered on a selected track. At the completion of the track centering move, for the dedicated head, the switch S1 is switched to connect the sampled track follower 10 to the position compensation stage 14. At this time, the switch S3 is moved to connect the selected sampled servo head H2 to the sampled track follower 10. The sampled servo head H2 is now track centered on the selected track.

The seek mode of operation and the track following modes of operation are under the control of the drive controller 32 responding to requests of the host computer 30. Thus, in response to a request from the host computer 30, for a read or write operation with a selected head H1 or H2, for example, the drive controller produces a head address signal via a circuit 33 to a drive controller 40 which controls the switch S3. If the head address selects the head H2, the switch S3 is repositioned to connect the head H2 to the sampled servo track follower 10. This information is also communicated to the servo processor 34 via the controller interface 36. The servo processer now controls the dedicated track follower 12 to initiate the seek mode of operation, opens the switch S2 and at some point in the cycle of the seek operation, connects the dedicated servo track follower 12 to the position compensation network 14 by means of the switch S1. In the seek mode of operation, the track crossing detector 38 provides a count of actual track crossings, during movement to the new track address, to the servo processor and at the selected track the A to D converter provides a track address which is compared with the track address provided to the servo processor by the controller interface 36.

At the correct track address, the seek mode is completed. The servo processor closes the switch S2, closing the fine position servo loop, and the output of the dedicated track follower which is now coupled to the position compensation network 14 via switch S1, provides the input to the servo to track center the dedicated head on the selected track. Upon the completion of track centering of the dedicated head, the switch S1 is operated by the servo processer to connect the sampled servo track follower 10 to the position compensation network 14. The sampled servo head H2 which has been selected is now in the servo loop and is track centered on the selected track. An offtrack detector 44 is used to disable reading or writing operations. If a selected head should wander off track, the output of the off track detector signals the servo processor to disable the operation.

SERVO GAIN COMPENSATION

Figures 4, 5:
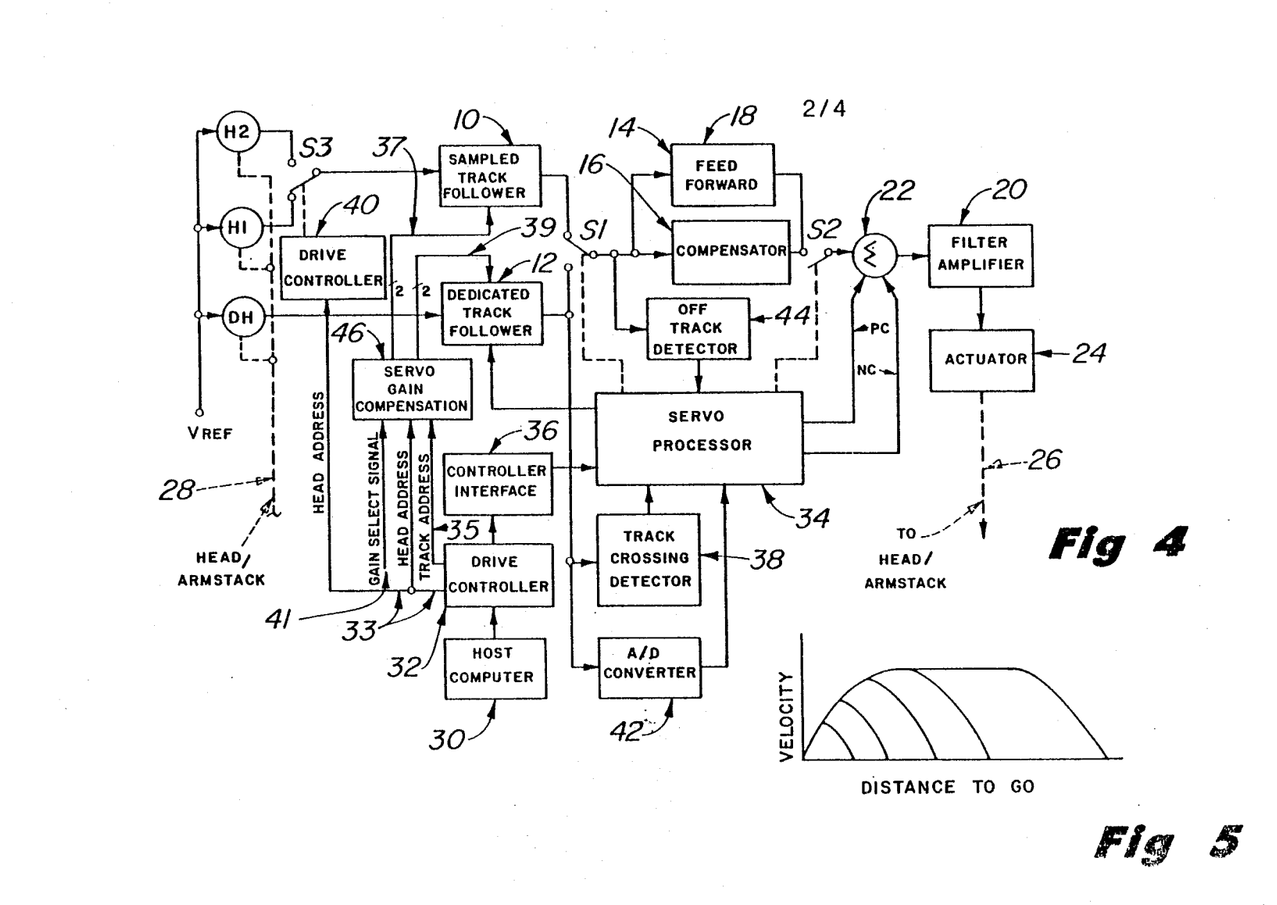
FIG. 4 is a block diagram of a presently preferred embodiment to this invention.
FIG. 5 graphically depicts typical servo velocity profiles.

The gain of the servo system varies both from head to head and inner diameter to outer diameter of the tracks on the discs. To maintain maximum margin in the servo system, this gain variation must be minimized. This is done for both the sampled servo and dedicated servo functions simultaneously. As discussed hereinabove, the servo gain for each of the magnetic heads is measured at four track positions across the disc surfaces. The required signal gain correction to equalize the servo gain is then calculated and is stored in a programmable read only memory to be addressed by the drive controller 32. A servo gain compensation system is illustrated in FIG. 4. Here, a servo gain compensation network 46 is coupled between the drive controller 32 and the respective track follower circuits 10 and 12. As described hereinafter, the servo gain compensation network 46 includes a programmable read only memory in which the servo gain correction for each head at each track location is stored. The head and track addresses are coupled to the programmable read only memory in the servo gain compensation network 46 by circuits 33 and 35 from the drive controller. Circuits 37 and 39, respectively, couple the sampled servo gain correction signals and the dedicated servo gain correction signals to the sampled track follower 10 and the dedicated track follower 12, respectively. Since only one programmable read only memory is provided in the servo gain compensation network 46, a gain selection signal, FIG. 3, via circuit 41, is coupled to the servo gain compensation network to repetitively switch the servo gain correction currents between the respective track follower circuits. By this expedient, the outputs of the respective track followers maintain the servo gain within permissable limits, that is to maintain the maximum margin in the servo system.

The details of the servo gain compensation network are illustrated in FIGS. 6 through 9, in which FIG. 6 is the block diagram of the compensation network. Now referring to FIGS. 6 through 9, the drive controller 32 provides head address and track address inputs to a programmable read only memory 48. As discussed above, a servo gain correction signal is stored at the track address for each head. These track and head addresses, as input to the memory 48, are evidenced in greater detail in FIG. 8 and may also include memory chip addresses, as shown, depending upon the organization of the memory. The gain select signal is also an input signal to the memory 48. The 8 bit digital output from the programmable read only memory 48 is coupled as input to a digital to analog converter 50.

Figure 8:
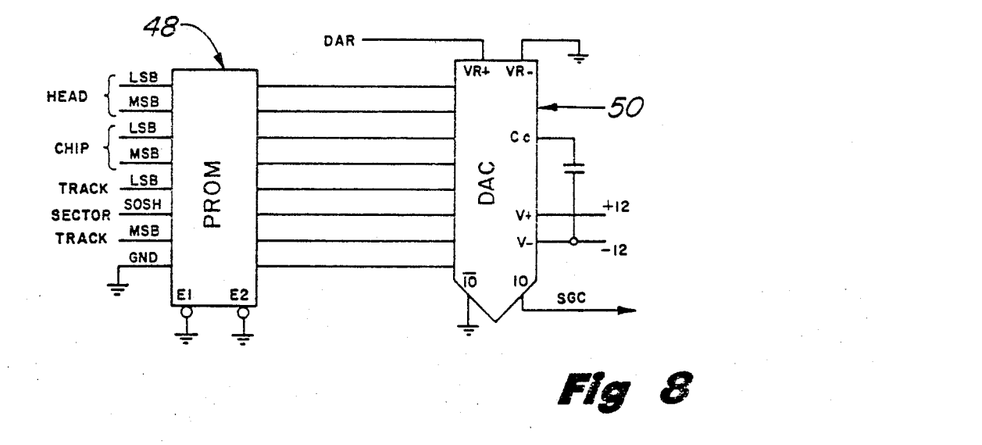
FIG. 8 is a block diagram developing further details of the programmable read only memory and the digital-to-analog converter of FIG. 6.

The digital to analog convertor 50 is conventional and in response to the 8 bit input produces an analog servo gain correction current SGC which is scaled from the reference current DAR, FIG. 8. The servo gain correction current from the digital to analog convertor creates a voltage across resistor 51 coupled between the output of the digital to analog converter 50 and ground. Normally a fixed voltage appears across this resistor, say, −1 volt, when only the most significant bit of the programmable read only memory 48 is set. The current from the digital-to-analog convertor varies such that the voltage across the resistor 51 changes in fractional increments of a volt, for example, by 128th of a volt per bit of the binary value of the servo gain correction determined by the content of the programmable read only memory 48.

Figure 7:
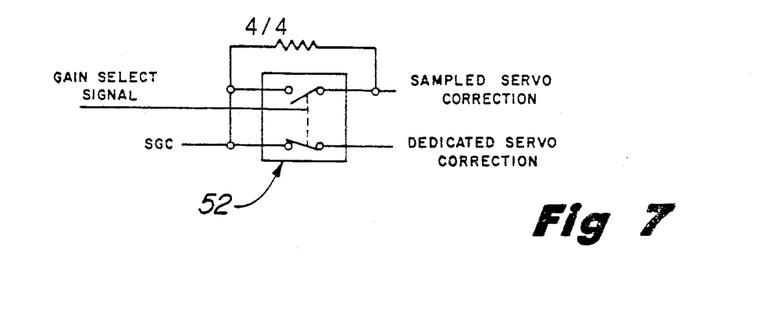
FIG. 7 functionally depicts the field effect transistor switch of FIG. 6.

Since it is necessary to simultaneously maintain both servo gain corrections, the programmable read only memory and the output of the digital to analog converter are multiplexed by switching between stored selected sampled and dedicated automatic gain correction values by means of the gain select signal. To this end a field effect transistor switch 52, to which the output of the digital-to-analog converter is connected, is switched simultaneously with the address of the programmable read only memory 48 by means of the gain select signal. The servo gain correction current SGC is coupled to the switch 52. The mechanical equivalent of the field effect transistor switch is depicted in FIG. 7. Storage capacitors 54 and 56 are coupled to the respective output circuits of the switch 52 and thus temporarily store the sampled servo gain correction and the dedicated servo gain correction. The frequency of switching under the control of the gain select signal is thus selected to match the time constants of the capacitor circuits. The capacitors 54 and 56 are buffered by buffer amplifiers 58 and 60, respectively, so that the capacitor voltages will not sag between samples. The gain select signal may be conveniently produced by the dedicated servo head responding to the start of each sector on the dedicated servo surface.

If a fault should occur, such as in an offtrack situation the gain select signal is automatically turned off, leaving the automatic gain control multiplexing system in the dedicated servo mode. This is necessary to get the system back on track. A resistor 53 coupled between the resistor 51 and capacitor 54 guarantees that even if this condition exists for some time, the charge on the capacitor 54 will not drift far from a nominal gain value.

The output of the sampled servo buffer amplifier 58 is the reference voltage for the sampled servo AGC integrator 62 and is also multiplied by a negative constant in an amplifier 64 which is referenced to ground. The output of amplifier 64 is the sampled servo correction reference SSCR. This is the reference voltage for a sampled servo dibit detector 66. The sampled servo correction reference voltage SSCR is held at a constant percentage of the signal amplitude. Similarly the output of the dedicated servo buffer amplifier 60 is the reference voltage for the dedicated servo automatic gain control integrator 68, the output of which is a dedicated automatic gain control reference DAGC. The output of the dedicated servo buffer amplifier 60 is also multiplied by a negative coefficient in the amplifier 70, which is referenced to ground, to produce the output ZDV which is the dedicated servo reference voltage. The dedicated servo reference voltage is coupled to the dedicated servo dibit detector 72. The other inputs 67 and 73, respectively, to each of the dibit detectors 66 and 72 are the filtered and amplified sampled servo and dedicated servo head voltages. In the case of the sampled servo dibit detector this is the filtered and amplified voltage from the selected sampled servo head. The output of the dibit detectors is the servo signal which is corrected for servo gain. While the dibit detectors have been shown separately from the respective track follower circuits, these are considered to be a part of the sampled servo and dedicated servo track follower circuits 10 and 12 of FIG. 4. The outputs of the respective track follower circuits 10 and 12 are connected to the switch S1 as shown in FIG. 4.

In the track following mode, track centering signals are developed from servo code magnetic transitions which are 180 degrees out of phase with one another in one period on the disc surface and which define the opposite sides of a data track, for example, or a dedicated servo track. When these developed signals are equal the head is considered to be track centered. When one or the other of these signals is the greater the servo responds so that the head is moved in a direction radially of the track to equalize the signal amplitudes. In such an arrangement amplitude control or qualification is essential in realizing proper servo operation. For this reason, the reference voltages $V_{SLVL}$ and $V_{DLVL}$ coupled to the positive terminals of the automatic gain control integraters 62 and 68, respectively, are derived from voltages which are the sums of the two voltages derived from the magnetic transitions of the servo code defining the sides of the respective tracks. Thus if these voltages are described as the voltages A and B, FIG. 9, the sum of these two voltages represents, in the case of the sampled servo, a sampled servo level voltage and in the case of the dedicated servo, the dedicated servo level voltage. These are indicated as being coupled to the respective negative terminals of the integraters 62 and 68. The voltages A and B are characteristically depicted in FIG. 9 for a head which is track centered.

Figure 9:
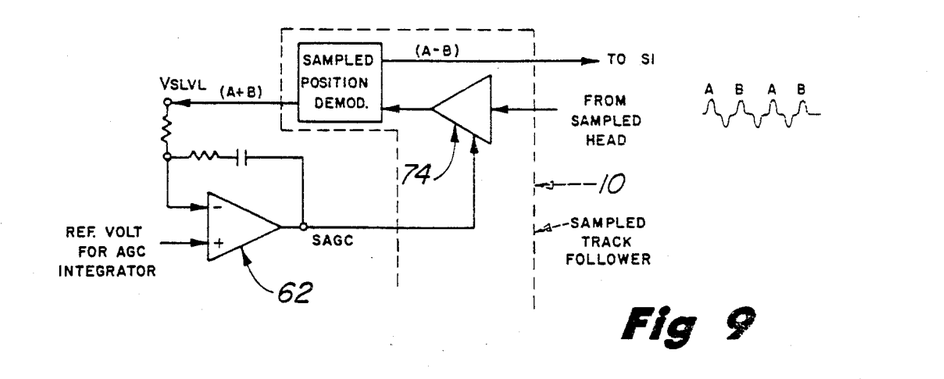
FIG. 9 illustrates a circuit for developing the reference or level voltage for the sampled servo AGC integrator and for developing the track position error voltage. A similar circuit is used for the dedicated servo AGC integrator.

FIG. 9 illustrates a circuit for generating the sampled servo level voltage A+B. These voltages derived from the magnetic transitions of the servo code on a particular data track by a sampled servo head are coupled as input to a variable gain amplifier 74, the gain of which is controlled by the sampled servo automatic gain control voltage SAGC from amplifier 62. The output, A+B, represents the sampled servo level voltage $V_{SLV}$. This output is coupled, via sampled position demodulator 75, to the negative input terminal of the amplifier 62. This circuit is also a part of the sampled servo track follower 10 of FIG. 4. The other output, A−B, of the demodulator 75 is the track following signal connected to switch S1. A similar circuit applies to the dedicated track follower circuit 12 for producing the dedicated servo level voltage $V_{DLVL}$ for the amplifier 68.

In the arrangement described, once the servo gain corrections are determined and stored in the programmable read only memory 48, this memory must be kept with that head disk assembly (HDA). The correctons are unique to that HDA. One way of assuring that the memory remains with the HDA is to physically secure the memory to the HDA. This may be accomplished by physically securing the memory as well as the connected digital-to-analog converter to the flexible circuit connecting the magnetic heads to the drive electronics. In this case the memory and the digital-to-analog converter are conveniently coupled to the servo system via the flexible circuit connector.

Alternatively the servo gain corrections for a disc drive may be stored on one of the memory discs. In this way the servo gain corrections for that disc drive also remain with the HDA. The corrections may be written at any convenient location on a disc, for example, in either the inner or outer radial track locations. In such an arrangement a random access memory replaces the programmable read only memory 48 in the system. This random access memory remains with the electronics and is not a permanent part of the HDA as is the programmable read only memory 48.

The servo gain corrections may be written on any one of the memory discs. In a system such as that described in FIG. 4, the corrections may be written on the dedicated servo code surface. However, the corrections may be written on any of the other discs whether or not dedicated servo control is employed in head positioning.

Two approaches to servo gain correction using the magnetic disc for storage are employed. One employs a preset servo gain for reading all servo gain corrections recorded on a single track on a disc surface, and the other positions the head carriage against a crash stop, either the inner or outer crash stop, where servo gain corrections are identically recorded in multiple tracks.

In the first approach, the servo gain is calibrated or approximated for a selected head at a fixed radial position. A resistance in the servo system could be employed for this purpose. Thereafter servo gain corrections for all other heads are written in a single track at any convenient location on the disc, using the preset gain. The corrections are now permanently associated with that HDA along with a method for accessing the corrections.

Whenever the disc drive is powered up the selected head and track are addressed. The preset servo gain allows reading the servo gain corrections at the selected track. The corrections which are read out are stored in a random access memory for use in a servo system, whether using dedicated servo or sampled servo techniques, in track seeking and track following operations.

In the second approach, servo gain corrections may be recorded in inner or outer radial positions on a memory disc. Here, identical recordings in a multiplicity of adjacent tracks is employed because of the coarse nature of head positioning employed in reading the corrections. Whenever the disc drive is powered up the carriage is driven against the crash stop in the selected radial limit. The servo gain corrections are read out and stored in the random access memory for use in a servo system, as discussed above.

Although specific circuits and specific examples have been given herein in disclosing the best modes for practicing the present invention, it will be appreciated that other circuits and other techniques may be employed in practicing this invention.

INDUSTRIAL APPLICABILITY

This invention is generally applicable in magnetic disc drives involving pluralities of magnetic servo heads to achieve servo gain compensation so that all servo heads appear to have close to the same servo gain when coupled into the servo loop.

What is claimed is:

1. The method of compensating for servo gain variations when the servo is connected to different magnetic heads supported to simultaneously scan respective memory discs in a disc drive, comprising:
   a. determining at corresponding tracks on the different memory discs, individual servo gain corrections for each magnetic head at several different selected tracks on the associated memory discs;
   b. Storing the individual servo gain corrections in a read only memory;
   c. addressing said read only memory for a stored individual servo gain correction for a selected magnetic head at a selected track, for coupling to said servo to equalize servo gain when positioning any selected magnetic head at a selected one of its tracts;
   d. utilizing one magnetic head as a dedicated head and the associated memory disc as a dedicated servo code memory disc;
   e. utilizing a second magnetic head as a sampled servo magnetic head and the associated memory disc as a sampled servo code memory disc, the addressed stored individual servo gain corrections for said dedicated servo magnetic head and said sampled servo magnetic head being for corresponding tracks on said dedicated servo code memory disc and said sampled servo code memory disc; and
   f. switching access between said addressed, stored individual servo gain corrections for providing servo gain corrections to control positioning of the dedicated servo magnetic head and the sampled servo magnetic head.

2. The method of claim 1, in which:
   a. said addressed stored individual servo gain corrections are separately stored prior to switching.

3. The method of claim 2, comprising:
   a. stopping said switching with that individual servo gain correction for said dedicated servo magnetic head switched to said servo.

4. The invention according to claim 3, comprising:
   a. continuing to separately store for a predetermined interval that individual servo gain correction for said sampled servo magnetic head after stopping of said switching.

5. In a magnetic disc memory drive, a system for compensating for servo gain variations when the servo is connected to different magnetic heads each of which scan magnetic servo tracks on a surface of respective rotatable memory discs, comprising:
   a. storage means for storing at specific addressable locations servo gain correction signals for each magnetic head;
   b. carriage means movably supporting said magnetic heads to simultaneously scan corresponding magnetic servo tracks on each of said memory discs;
   c. servo means coupled to said carriage means to move said carriage means for simultaneously moving said magnetic heads to corresponding tracks on said memory discs;
   d. one of said memory discs being a dedicated servo memory disc having a dedicated servo magnetic head and other memory discs being sampled servo memory discs each having a sampled servo magnetic head;
   e. means for selectively electrically, connecting said dedicated servo magnetic head and one sampled servo magnetic head to said servo means;
   f. means for addressing said storage means to select a servo correction signal for a designated track for said one sampled servo magnetic head and for the same designated track for said dedicated magnetic servo head; and
   g. means for coupling a respective said servo correction signal to said servo means with the respective connection of said one sampled servo magnetic head and said dedicated servo magnetic head to said servo means.

6. The method of compensating for servo gain variations when the servo is connected to different magnetic heads supported to scan respective memory discs in a magnetic disc drive having a crash stop, comprising:
 a. determining at corresponding tracks on the different memory discs, individual servo gain corrections for each magnetic head at several different selected tracks on the associated memory disc;
 b. repeatedly recording said individual servo gain corrections in a plurality of adjacent tracks in a track position adjacent said crash stop;
 c. reading said individual servo gain corrections by a single magnetic head at said track position adjacent a crash stop;
 d. storing individual servo gain corrections which are read in individually addressable locations; and
 e. addressing a stored individual servo gain correction for coupling to said servo to equalize servo gain when positioning any selected magnetic head at a selected one of its tracks.

* * * * *